United States Patent
Esnouf

(10) Patent No.: US 10,493,973 B2
(45) Date of Patent: Dec. 3, 2019

(54) DEVICE FOR MEASURING THE THICKNESS OF AUTOMOTIVE DISC BRAKE ROTORS

(71) Applicant: Philip Stuart Esnouf, Richmond (AU)

(72) Inventor: Philip Stuart Esnouf, Richmond (AU)

( * ) Notice: Subject to any disclaimer, the term of this patent is extended or adjusted under 35 U.S.C. 154(b) by 301 days.

(21) Appl. No.: 15/038,160

(22) PCT Filed: Nov. 20, 2014

(86) PCT No.: PCT/AU2014/050361
§ 371 (c)(1),
(2) Date: May 20, 2016

(87) PCT Pub. No.: WO2015/074113
PCT Pub. Date: May 28, 2015

(65) Prior Publication Data
US 2016/0280200 A1 Sep. 29, 2016

(30) Foreign Application Priority Data
Nov. 21, 2013 (AU) .............................. 2013904508

(51) Int. Cl.
*G01B 5/06* (2006.01)
*G01B 3/20* (2006.01)
(Continued)

(52) U.S. Cl.
CPC ............ *B60T 17/221* (2013.01); *F16D 65/12* (2013.01); *F16D 66/02* (2013.01); *G01B 3/205* (2013.01); *G01B 5/0028* (2013.01); *G01B 5/06* (2013.01)

(58) Field of Classification Search
CPC . G01B 5/255; G01B 5/06; G01B 3/18; G01B 5/08; G01B 5/12; G01B 5/285;
(Continued)

(56) References Cited

U.S. PATENT DOCUMENTS

| | | | | |
|---|---|---|---|---|
| 3,691,640 A | * | 9/1972 | McFarland | G01B 5/0028 33/609 |
| 3,745,661 A | * | 7/1973 | Atzberger | G01B 5/08 33/501.06 |
| 3,810,310 A | * | 5/1974 | Morgan | G01B 3/18 33/816 |

(Continued)

FOREIGN PATENT DOCUMENTS

| | | |
|---|---|---|
| CA | 2380561 A1 | 10/2003 |
| DE | 202012103923 U1 | 1/2013 |
| FR | 2812938 A1 | 2/2002 |

*Primary Examiner* — Yaritza Guadalupe-McCall
(74) *Attorney, Agent, or Firm* — Banner & Witcoff, Ltd.

(57) ABSTRACT

A vernier calliper for measuring the thickness of a disc brake rotor fitted to a vehicle, the vernier calliper including:
(i) first and second members which are mounted for sliding movement relative to one another along an axis;
(ii) first and second abutments located on the first and second members respectively and being adapted, in use, to engage first and second sides of a disc brake rotor, the first abutment including an abutment surface;
(iii) retaining means for retaining the calliper in an operative position in which:
(iv) the first abutment surface engages the first side of the disc and is parallel thereof;
(v) the second abutment engages the second side of the disc; and
(vi) said axis is orthogonal to said first and second sides of the disc.

16 Claims, 6 Drawing Sheets

(51) Int. Cl.
*B60T 17/22* (2006.01)
*F16D 66/02* (2006.01)
*F16D 65/12* (2006.01)
*G01B 5/00* (2006.01)

(58) Field of Classification Search
CPC ...... G01B 11/275; G01B 21/04; G01B 21/08; G01B 2210/306; G01B 3/205; G01B 3/28
USPC .......................................................... 33/534
See application file for complete search history.

(56) References Cited

U.S. PATENT DOCUMENTS

| | | | | |
|---|---|---|---|---|
| 3,845,564 A * | 11/1974 | Morgan | ................... | G01B 3/18 33/816 |
| 3,956,830 A * | 5/1976 | MacMillan | ............ | G01B 5/255 33/337 |
| 4,546,548 A * | 10/1985 | Bullock, Sr. | ............. | G01B 5/24 33/203 |
| 5,469,629 A * | 11/1995 | Rogler | ..................... | G01B 5/06 33/609 |
| 5,974,878 A * | 11/1999 | Newell | ..................... | B23B 5/04 73/462 |
| 6,101,911 A * | 8/2000 | Newell | ..................... | B23B 5/04 82/112 |
| 6,442,863 B1 * | 9/2002 | Poineau | ............... | G01B 3/1071 33/755 |
| 7,444,753 B1 * | 11/2008 | Howe | ..................... | G01B 5/255 33/203.18 |
| 7,735,237 B1 * | 6/2010 | Moon | ...................... | G01B 3/20 33/783 |
| 8,438,748 B1 * | 5/2013 | Moon | .................. | G01B 5/0002 33/783 |
| 8,826,557 B2 | 9/2014 | Yang | | |
| 9,500,462 B2 * | 11/2016 | Reble | ................... | G01B 5/0028 |
| 2005/0115088 A1 * | 6/2005 | Paulsen | .................. | G01B 5/255 33/203.18 |
| 2008/0189971 A1 * | 8/2008 | Wo | ......................... | G01B 3/205 33/784 |
| 2012/0246955 A1 * | 10/2012 | Smith | ..................... | G01B 3/22 33/517 |
| 2012/0255186 A1 * | 10/2012 | Allen | ....................... | E06B 1/04 33/194 |
| 2015/0121712 A1 * | 5/2015 | Ott | ....................... | B27B 17/0025 33/700 |
| 2016/0069656 A1 * | 3/2016 | Cook | ....................... | G01B 5/14 33/549 |
| 2018/0003476 A1 * | 1/2018 | White | ................... | G01B 5/0028 |

* cited by examiner

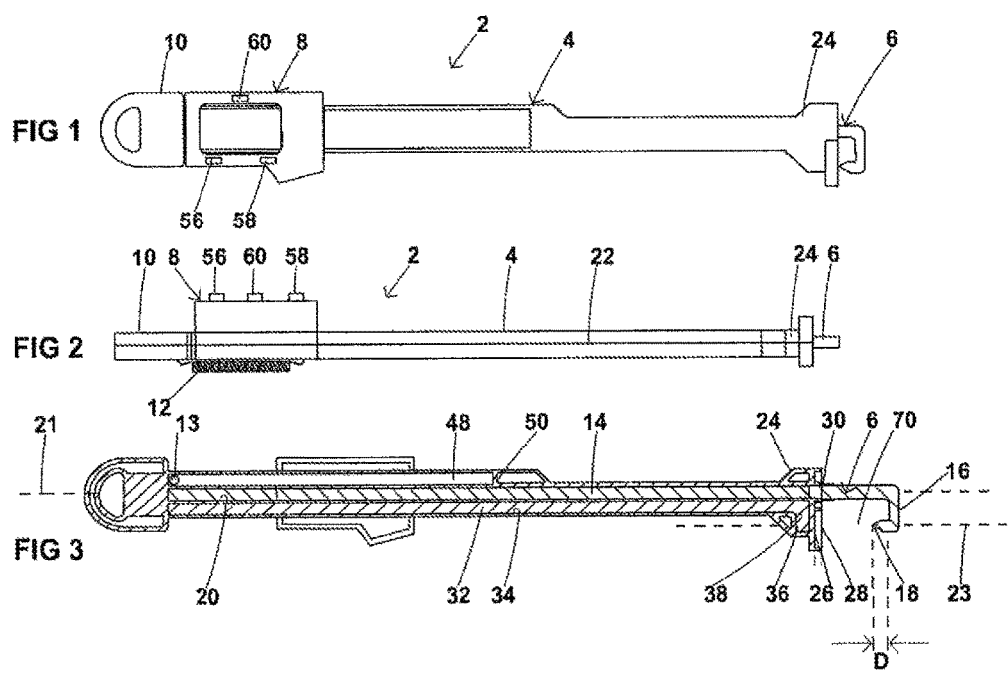

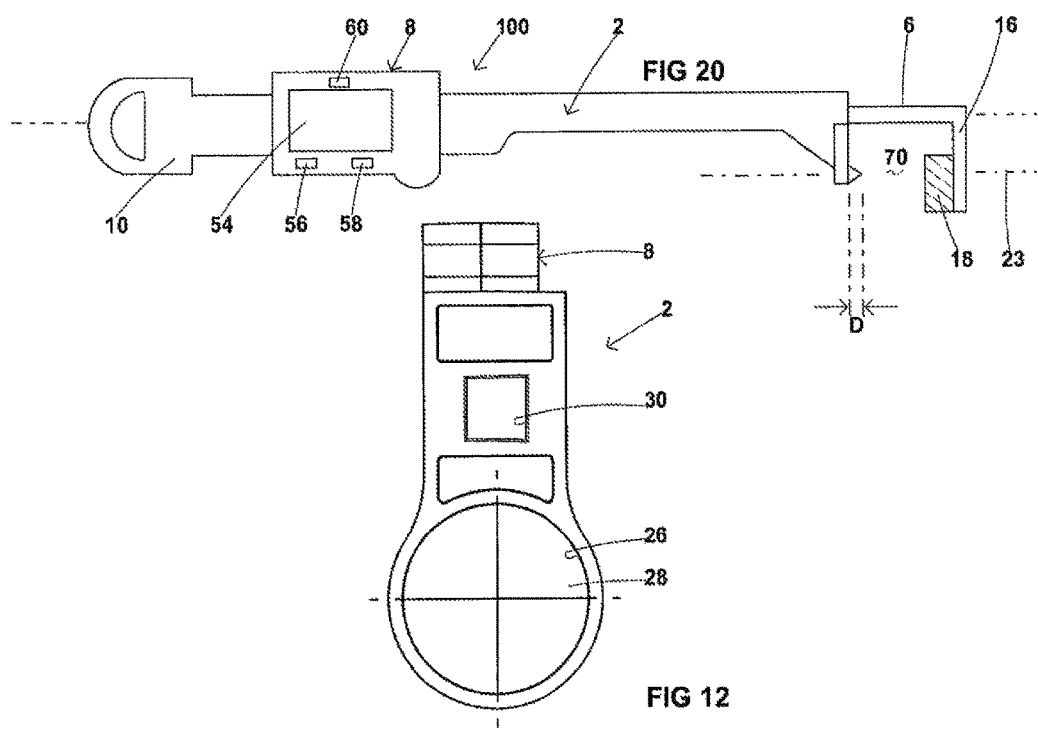

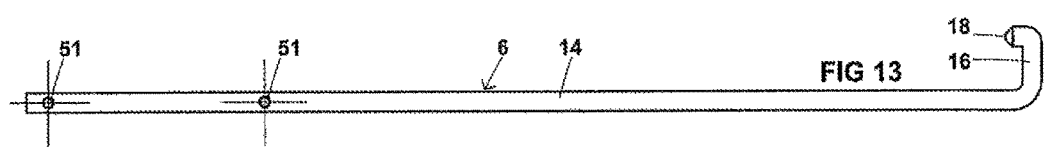
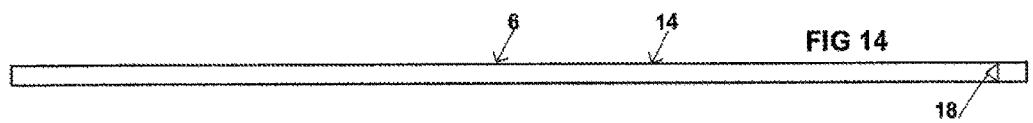
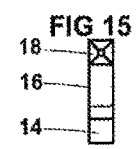
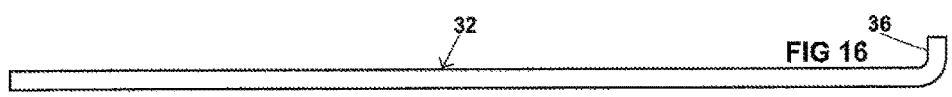
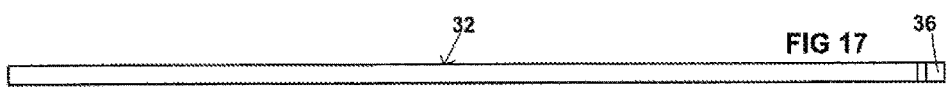

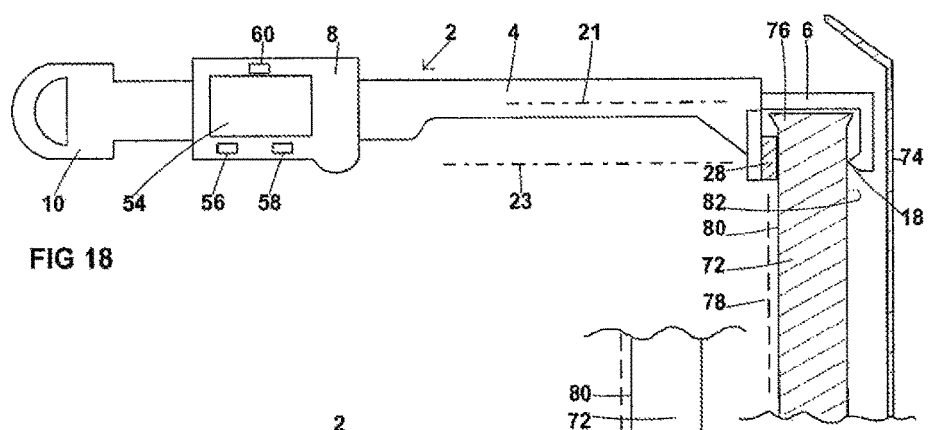
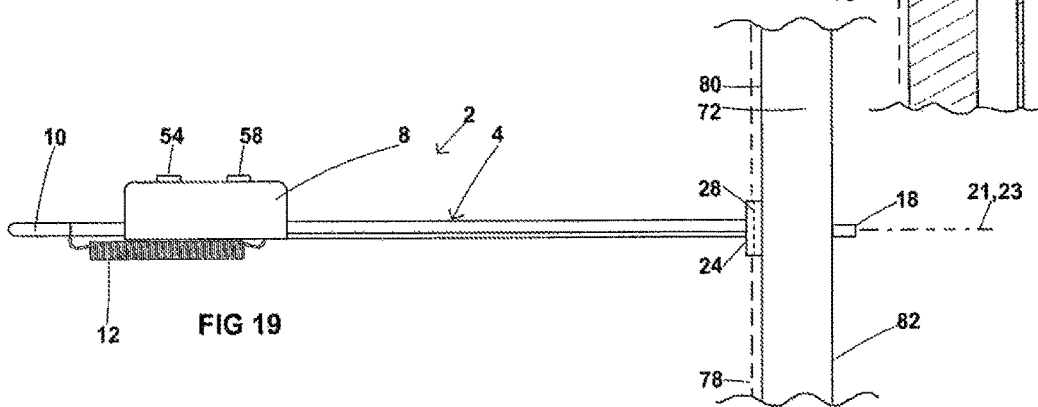

DEVICE FOR MEASURING THE THICKNESS OF AUTOMOTIVE DISC BRAKE ROTORS

The application is a U.S. National Phase Entry of International Application No. PCT/AU2014/050361 filed on Nov. 20, 2014, designating the United States of America and claiming priority to Australian Patent Application No. 2013904508 filed on Nov. 21, 2013. The present application claims priority to and the benefit of the above-identified applications, and the above-identified applications are incorporated by reference herein in their entireties.

FIELD OF THE INVENTION

This invention relates to a vernier calliper which can be used for measuring the thickness of automotive disc brake rotors.

BACKGROUND OF THE INVENTION

As a result of the cessation of the use of asbestos in automotive disc brake pads there has been a significant change in the pattern of wear in disc brakes. The use of new non-asbestos materials has required a change in the hardness of the steel used on the disc rotor and this has resulted in increased wear of the disc rotor ("disc") itself. The need to replace disc brakes and the frequency of replacement has become a more common element of vehicle maintenance and a significant cost centre. The practice of machining discs has become uncommon as the discs tend to wear quickly to a thickness outside of the manufacturers specification hence replacement is required. The vast majority of brakes are steel, although there are a small number of ceramic or carbon fibre discs these tend to be for racing or belong to exotic marques.

Most cars have some form of sensing that indicates wear in the disc pad, usually in the form of a sensor that is attached to the pad and become exposed when the friction material is worn past a certain point. In contrast currently there is no simple means of measuring the thickness of the disc without the removal of the wheel in order to access the disc.

The object of the present invention is to provide a device and method which can be used to conveniently measure the thickness of a disc brake rotor insitu on a stationary vehicle. As will be described in more detail below, the most convenient implementation of the invention can be carried out by modifying known forms of digital vernier devices. Digital vernier devices are readily available and these devices typically have a pair of jaws at one end referred to for convenience as the proximal end and a slider body located adjacent to the jaws. Sometimes a probe is located at the distal end for measurement of the depth of a bore.

A device of conventional construction cannot conveniently be used to measure the thickness of a disc brake rotor without first removing the road wheel of the vehicle because it would be difficult to position the jaws so that they could engage opposite sides of the disc brake. Also, many vehicles have a dust cover inwardly adjacent to the rotor which could also interfere with positioning of jaws of a known form of calliper. Further, when disc brakes wear, they tend to form a lip at the outer periphery of the rotor which is not engaged by the disc brake pad and therefore does not wear. In a normal vernier calliper, the jaws are straight and the jaws would tend to engage the lip rather than the operating surfaces of the disc rotor so that an accurate reading of the wear on the disc brake could not be obtained.

SUMMARY OF THE INVENTION

According to the present invention there is provided a vernier calliper for measuring the thickness of a disc brake rotor fitted to a vehicle, the vernier calliper including:
(i) first and second members which are mounted for sliding movement relative to one another along an axis;
(ii) first and second abutments located on the first and second members respectively and being adapted, in use, to engage first and second sides of a disc brake rotor, the first abutment including an abutment surface; and
(iii) retaining means for retaining the calliper in an operative position in which:
(iv) the first abutment surface engages the first side of the disc and is parallel thereof;
(v) the second abutment engages the second side of the disc; and
(vi) said axis is orthogonal to said first and second sides of the disc.

The invention also provides a digital vernier calliper including:
a display;
a first arm;
a slider body which slidably mounted on the first arm, the slider body including a digital display;
a second arm extending in a distal direction from the slider body and being movable therewith;
the second arm having an abutment member at its distal end;
measurement circuitry in the slider body responsive to the relative positions of the first and second arms and coupled to provide distance measurement signals to the digital display;
the first arm including a magnet at its distal end; and
wherein the arrangement is such that, in use, the magnet can be magnetically coupled to the outer face of a disc of a disc brake and the slider moved in a proximal direction so that the abutment member engages an inner face of the disc and so that, in use, the display displays a distance value indicative of the distance between the inner and outer faces of the disc.

The invention also provides a digital vernier calliper including:
a first arm;
a slider body which slidably mounted on the first arm, the slider body including a digital display;
a second arm extending in a distal direction from the slider body and being movable therewith;
characterised in that the slider body is located at the proximal end of the second arm; and
first and second abutment elements are mounted at the distal ends of the first and second arms respectively.

The invention also provides a method of measuring the thickness of a disc brake for a vehicle using a digital vernier having first and second movable members having a first abutment surface and a second abutment respectively and digital display means, the method including the steps of:
(i) engaging the first abutment surface with a first side of the disc, with the abutment surface being parallel to said first side of the disc;
(ii) engaging the second abutment with a second side of the disc;
(iii) performing a zeroing function on said digital display;

(iv) disengaging the first abutment surface and the second abutment from the disc;
(v) returning the first and second members to an initial position in which the first abutment surface engages or substantially engages said second abutment; and
(vi) determining the thickness of the disc brake by reference to a reading of the digital display after steps (i) to (v) have been carried out.

BRIEF DESCRIPTION OF THE DRAWINGS

The invention will now be further described with reference to the accompanying drawings, in which:

FIG. 1 is a side view of a vernier calliper constructed in accordance with the invention;
FIG. 2 is a plan view of the calliper;
FIG. 3 is a longitudinal cross-section through the calliper with the distal ends of the arms separated;
FIG. 12 is an enlarged end view of the first arm;
FIG. 13 is a side view of the second arm;
FIG. 14 is a plan view of the second arm;
FIG. 15 is an end view of the second arm;
FIG. 16 is a side view of a reinforcing arm;
FIG. 17 is a plan view of the reinforcing arm;
FIG. 18 schematically illustrates the use of the calliper measuring the thickness of a disc brake rotor;
FIG. 19 is a schematic plan view of the calliper in use;
and
FIG. 20 is a schematic side view of a modified vernier calliper of the invention.

DETAILED DESCRIPTION

Figure 4:
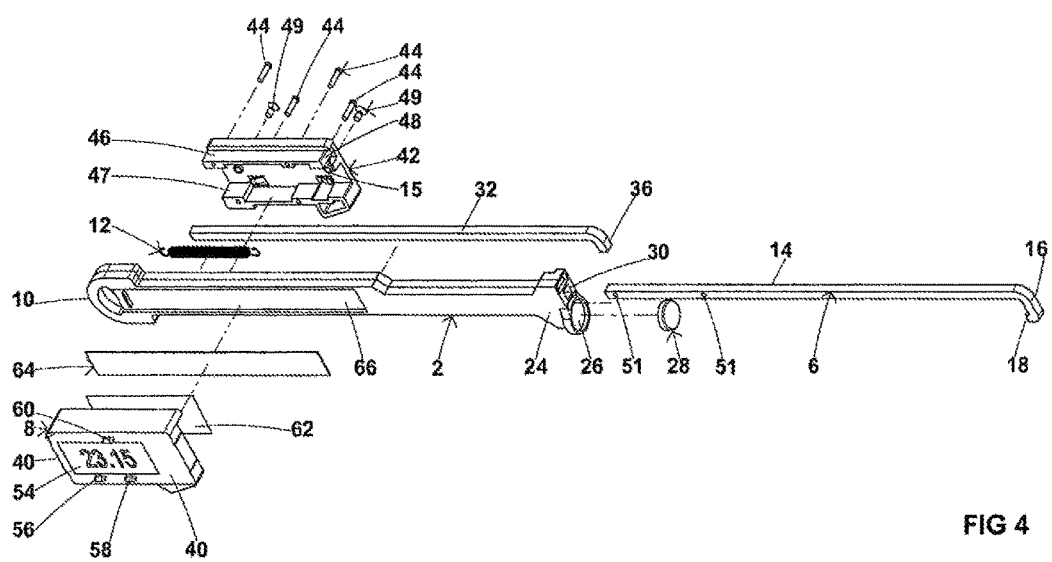
FIG. 4 is an exploded view of the calliper.
Figure 5:
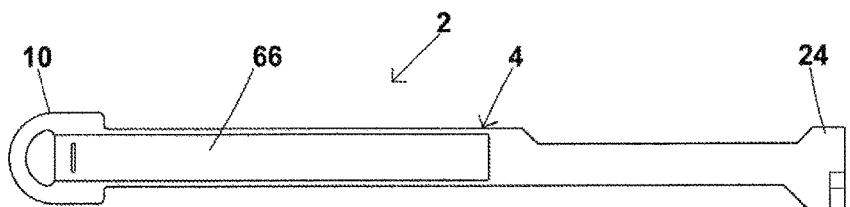
FIG. 5 is a side view of a first arm of the calliper.
Figure 6:
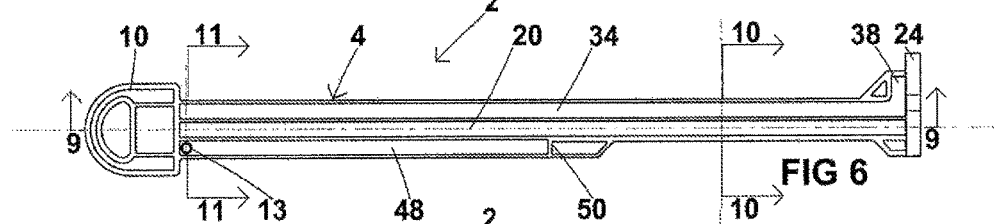
FIG. 6 is a view of the other side of the first arm.
Figure 7:
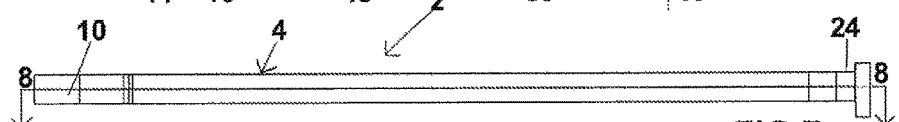
FIG. 7 is a plan view of the first arm.
Figure 8:
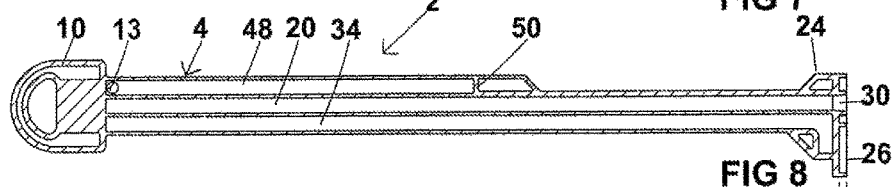
FIG. 8 is a cross-sectional view along the line 8-8.
Figure 9:
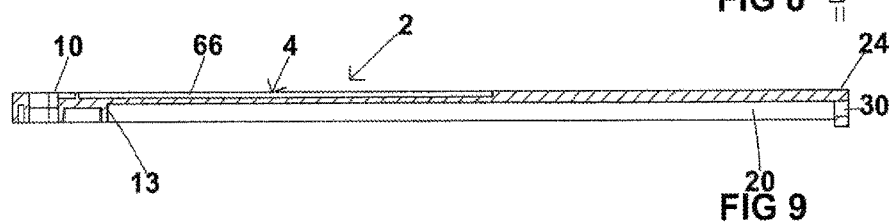
FIG. 9 is a cross-sectional view along the line 9-9.
Figure 10:
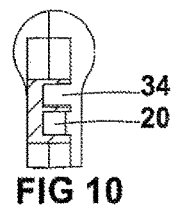
FIG. 10 is a cross-sectional view along the line 10-10.
Figure 11:
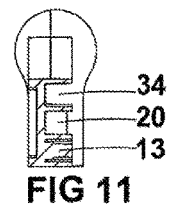
FIG. 11 is a cross-sectional view along the line 11-11.

FIGS. 1 to 4 diagrammatically illustrate a vernier calliper 2 constructed in accordance with the invention. The calliper 2 includes a first arm 4 which for convenience will be referred to as a stationary arm and a second arm 6 which for convenience will be referred to as a movable arm. As will be explained in more detail below, the second arm 6 is slidably mounted relative to the first arm 4. The vernier calliper 2 includes a slider body 8 which is coupled to the second arm 6 and is movable therewith. The first arm 4 is formed with a stop body 10 to limit movement of the slider body 8 to the left as seen in FIGS. 1 to 4. This direction will be referred to for convenience as the proximal end of the device and the opposite end of the first and second arms 4 and 6 for convenience will be referred to as the distal ends. The vernier calliper 2 includes a tension spring 12 which acts between the stop body 10 and the slider body 8 and serves to resiliently bias the slider body 8 into contact with the stop body 10. In the illustrated arrangement, the first arm 4 includes a spring mounting post 13 to which the proximal end of the spring 12 is connected and the slider body 8 includes an internal spring mounting post 15 to which the distal end of the spring 12 is connected.

FIG. 3 is a schematic side view of the vernier calliper 2 showing the slider body 3 and second arm 6 extended towards the right against the action of the spring 12. The second arm 6 includes an elongate shaft 14 having a lateral arm 16 located at its distal end. The arm 16 terminates in a proximally directed engagement tip 18. The elongate shaft 14 is mounted for sliding movement along its axis 21 in an elongate groove 20 formed in the first arm 4. The distal end of the first arm 4 includes a distal flange 24 which includes a recess 26 in which a permanent magnet 28 is mounted. The end flange 24 includes an opening 30 through which the elongate shaft 14 extends, as best seen in FIG. 3. Typically the magnet 28 is a rare earth magnet cylindrical in shape having a diameter of 12 mm and a thickness of 3 mm. The arrangement is such that the engagement tip 18 is offset from the axis 21 and is generally aligned with a centreline 23 of the magnet 28, as shown in FIG. 3. The distance between the axis 21 and centreline 23 is preferably in the range from 12 mm to 20 mm and most preferably 15 mm. It will also be seen that the engagement tip 18 extends in a proximal direction relative to the lateral arm and its tip is offset by a distance D as shown in FIG. 3. Preferably the distance D is in the range from 5 mm to 10 mm and preferably 8 mm. The offset distance D together with the offset between the centreline 23 and axis 21 enable the vernier calliper 2 of the invention to be conveniently used to measure wear in disc brake rotors, as will be described in more detail below.

The first arm 4 is preferably injection moulded from plastics material such as nylon or polycarbonate. The material could be reinforced with glass or carbon fibres. In order to improve or impart additional rigidity to the first arm 4, it includes a reinforcing arm 32 which is located in a second elongate groove 34 which is parallel to the groove 20. The reinforcing arm 32 includes a lateral arm 36 located in a lateral groove 38 formed in the distal flange 24. The reinforcing arm 32 is retained in the grooves 34 and 38 by interference fit and/or by the use of an adhesive. Alternatively, it would be possible to make the first arm 4 from metallic material such as forged stainless steel or aluminium and in that case the reinforcing arm 32 would not be required.

In the preferred form of the invention, the second arm 6 and the reinforcing arm 32 are made from stainless steel rod of square section and the sides are 4 mm wide. In the preferred form of the invention, the second arm 6 is about 212 mm long although this can be varied. The shapes of the second arm 6 and reinforcing arm 32 are shown in more detail in FIGS. 13 to 17.

In the illustrated arrangement, the slider body 8 is formed with a front panel 40 and back plate 42, the front panel and back plate being connected together by means of four screws 44 as shown in FIG. 4. The back plate 42 includes upper and lower cam formations 46 and 47 which are slidably movable along the upper and lower edges respectively of the first arm 4, as best seen in FIGS. 3 and 4 to assist in guiding linear movement of the slider body 8 along the first arm 4. Movement of the slider body 8 is limited in the distal direction by the distal end 50 of the cam formation 46 engaging a web 52 formed near the distal end of the third groove 48.

The slider body 8 is connected to the second arm 6 by means of mounting screws 49 which pass through bores in the back plate 42 and are received within threaded bores 51 formed near the proximal end of the second arm 6, as shown in FIG. 4.

The front panel 40 includes an LED display 54, includes an ON/OFF button 56, zero button 58 and unit button 60 for changing the display to read from metric or imperial units. A circuit board 62 is located within the slider body 8 between the front panel 40 and back plate 42. The circuit board 62 includes components for producing signals for the LED display 54. The device includes a printed or etched array 64 of conductive bars which is mounted in a recess 66 formed in the first arm 4. The circuit board 62 includes other etched or printed conductive bars (not shown), which are capacitively coupled to those in the array 64 and the circuitry is arranged to produce positional signals when the slider body 8 is moved relative to the array 64. The technique for producing signals in this way and displaying measurements is very well known and does not need to be described. The circuitry could, for instance, be the same or similar to that in known callipers made by Shenzhen Shenliang Precision Measuring Co., Ltd., of China.

In the assembled calliper 2 the slider body 8 is resiliently engaged against the stop body 10 by means of the spring 12. If the zero button 58 is pressed in this position and the slider body is then moved so that an object (not shown) can be placed between the gap 70, between the magnet 28 and engagement tip 18, the LED display will indicate the length of the gap 70 or the thickness or length of the object.

FIGS. 18 and 19 schematically illustrate the manner in which the vernier calliper 2 can be used to measure the thickness of the rotor 72 of the disc brake (not shown) of a vehicle (not shown). Typically the disc brake includes a dust cover 74 mounted inwardly of the disc brake rotor 72. In the illustrated arrangement, the disc brake rotor 72 has been subject to wear and a lip 76 (of unworn material) is normally formed at the outer periphery of the rotor, as shown in FIG. 18. The broken line 78 indicates the initial (unworn) outer or proximal face of the rotor which is spaced from the outer worn face 80 of the rotor, as shown. FIG. 19 is a schematic plan view in which the lip 76 has been omitted for clarity of illustration. It will be seen that the axis 21 of the second arm 6 is also held parallel to the centreline 23 of the magnet by engagement of the flat distal face of the magnet being held orthogonal to the worn face 80 by magnetic attraction.

The preferred manner in which the vernier calliper 2 is applied to the rotor is as follows. First, the user moves the slider body 8 in a distal direction away from the stop body 10 so as to form a gap 70 which is large enough to enable the engagement tip 18 to be moved over the lip of the rotor 72 as shown in FIG. 18. After this step, the user can then move the first arm 4 towards the rotor 72 so that the magnet 28 engages the worn face 80 of the rotor 72. The distal face of the magnet 28 is perpendicular to the longitudinal axis 21 of the second arm 6 and is firmly held in position by magnetic attraction. The pull force of the magnet 28 is in the range from 1.5 kg to 4 kg and preferably 2.6 kg. The user can then release the slider body 8 so that it moves in a proximal direction under the influence of the spring 12 so that the engagement tip 18 comes into contact with the inner worn face 82 of the disc brake rotor 72. When in this position, the user can press the zero button 58 so that a zero reading will appear on the LED display 54. The calliper can then be removed from the disc brake rotor. This can be carried out by moving the slider body 8 in a distal direction so that the engagement tip 18 disengages the worn face 82 of the disc brake rotor 72 and the vernier calliper 2 can then be moved away from the disc brake rotor 72. Normally some tilting of the first arm 4 will assist in disengaging the magnet 28 from the worn face 80. Having released the vernier calliper 2 from the disc brake the slider body 8 is moved by the spring 12 back to its position where it engages (or nearly engages) the stop body 10. The reading in this position indicates the thickness of the disc brake rotor 72, that is to say the distance between the faces 80 and 82. If the circuitry mounted on the circuit board 62 is identical to those used in normal digital vernier callipers then the reading will be shown as a negative value but this does not affect its accuracy. If necessary, the standard circuitry could be modified so that it shows as a positive value once this measurement procedure has been followed.

It will also be appreciated from FIG. 18 that if a person attempted to use a normal digital vernier calliper having straight edged jaws, if it were possible to place it in a position to engage the rotor 72 it would not produce an accurate reading because the jaws would engage the lip 76. Accordingly, the calliper 2 of the invention provides a substantial advantage in having its jaws located at a distal end of the device rather than the proximal end which is normal.

FIG. 20 illustrates a modified calliper 100 constructed in accordance with the invention. The same reference numerals will be used to denote parts which are the same as or correspond to those of the embodiment of FIGS. 1 to 19. In the calliper 100, the positions of the magnet 28 and the engagement tip 18 are reversed, that is to say the magnet 28 is located on the lateral arm 16 of the second arm 6 and the engagement tip 18 is located on the distal flange 24. The operation of this device is analogous to that described previously.

Some known digital callipers have the capacity to output data wirelessly or through an outlet port to a lap top or other receiving devices and it will be understood by a person skilled in the art that these capabilities can be incorporated into the calliper of the invention.

It will be appreciated that the calliper of the invention is a very simple yet effective way of determining wear in disc brake rotors.

| LIST OF PARTS | |
|---|---|
| vernier calliper | 2 |
| first arm | 4 |
| second arm | 6 |
| slider body | 8 |
| stop body | 10 |
| tension spring | 12 |
| spring mounting post | 13 |
| elongate shaft | 14 |
| spring mounting post | 15 |
| lateral arm | 16 |
| engagement tip | 18 |
| elongate groove | 20 |
| axis | 21 |
| join line | 22 |
| centreline | 23 |
| distal flange | 24 |
| recess | 26 |
| magnet | 28 |
| opening | 30 |
| reinforcing arm | 32 |
| second elongate groove | 34 |
| lateral arm | 36 |
| lateral groove | 38 |
| front panel | 40 |
| back plate | 42 |
| screws | 44 |
| upper and lower cam formations | 46, 47 |
| third groove | 48 |
| mounting screws | 49 |
| distal end | 50 |
| threaded bores | 51 |
| web | 52 |
| LED display | 54 |
| ON/OFF button | 56 |
| zero button | 58 |
| unit button | 60 |
| circuit board | 62 |
| array | 64 |
| recess | 66 |
| gap | 70 |

-continued

| LIST OF PARTS | |
|---|---|
| disc brake rotor | 72 |
| dust cover | 74 |
| lip | 76 |
| broken line | 78 |
| outer worn face | 80 |
| inner worn face | 82 |
| calliper | 100 |

The invention claimed is:

1. A vernier calliper for measuring the thickness of a disc brake rotor fitted to a vehicle, the vernier calliper including:
   (i) first and second members which are mounted for sliding movement relative to one another along an axis;
   (ii) first and second abutments located on the first and second members respectively and being adapted, in use, to engage first and second sides of a disc brake rotor, the first abutment including an abutment surface; and
   (iii) retaining means for retaining the calliper in an operative position in which:
   (iv) the abutment surface engages the first side of the disc and is parallel thereof;
   (v) the second abutment engages the second side of the disc;
   (vi) said axis is orthogonal to said first and second sides of the disc; and
   (vii) wherein the retaining means includes a permanent magnet which holds said abutment surface against the first side of the disc by magnetic attraction, when the disc is made from or includes magnetic material.

2. A vernier calliper as claimed in claim 1, wherein said abutment surface is a surface of the permanent magnet.

3. A vernier calliper as claimed in claim 1, wherein the permanent magnet is a rare earth permanent magnet.

4. A vernier calliper as claimed in claim 3, wherein the rare earth magnet provides, in use, a pull force of 1 to 4 kg.

5. A vernier calliper as claimed in claim 4, wherein the pull force is 2.6 kg.

6. A vernier calliper as claimed in claim 1, wherein the permanent magnet comprises a cylindrical body having a longitudinal axis and one of its circular end faces comprises the abutment surface.

7. A vernier calliper as claimed in claim 6, wherein the cylindrical body is about 12 mm in diameter.

8. A vernier calliper as claimed in claim 6, wherein the cylindrical body is about 3 mm long.

9. A vernier calliper as claimed in claim 6, wherein the second member includes a shaft having a shaft axis which is concentric with said axis and wherein the second abutment which includes a pointed element mounted at a distal end of the shaft and is offset relative to said shaft axis.

10. A vernier calliper as claimed in claim 9, wherein the pointed element is generally aligned with the longitudinal axis of the cylindrical body.

11. A vernier calliper as claimed in claim 9, wherein the pointed element is offset from the shaft axis by a distance of 12 mm to 20 mm.

12. A vernier calliper as claimed in claim 9, wherein the second member includes a transverse arm at its distal end and the pointed element is located adjacent to a remote end of said transverse arm, the pointed end projecting in a proximal direction relative to said transverse arm by a predetermined distance.

13. A vernier calliper as claimed in claim 12 wherein said predetermined distance is 5 mm to 10 mm.

14. A vernier calliper as claimed in claim 9, further including a digital display mounted in a display housing which is fixed relative to said shaft, and distance sensing means for sensing linear displacement of said first and second members, thereby enabling measurement of the distance between the first and second sides of the disc to be displayed on said digital display.

15. A vernier calliper as claimed in claim 14, further including biasing means for biasing the first abutment surface and the second abutment towards one another.

16. A vernier calliper as claimed in claim 15, wherein the biasing means includes a tension spring which acts between the display housing and said shaft.

* * * * *